E. J. BUSHEY.
DEMOUNTABLE RIM.
APPLICATION FILED APR. 19, 1909.
954,375.
Patented Apr. 5, 1910.
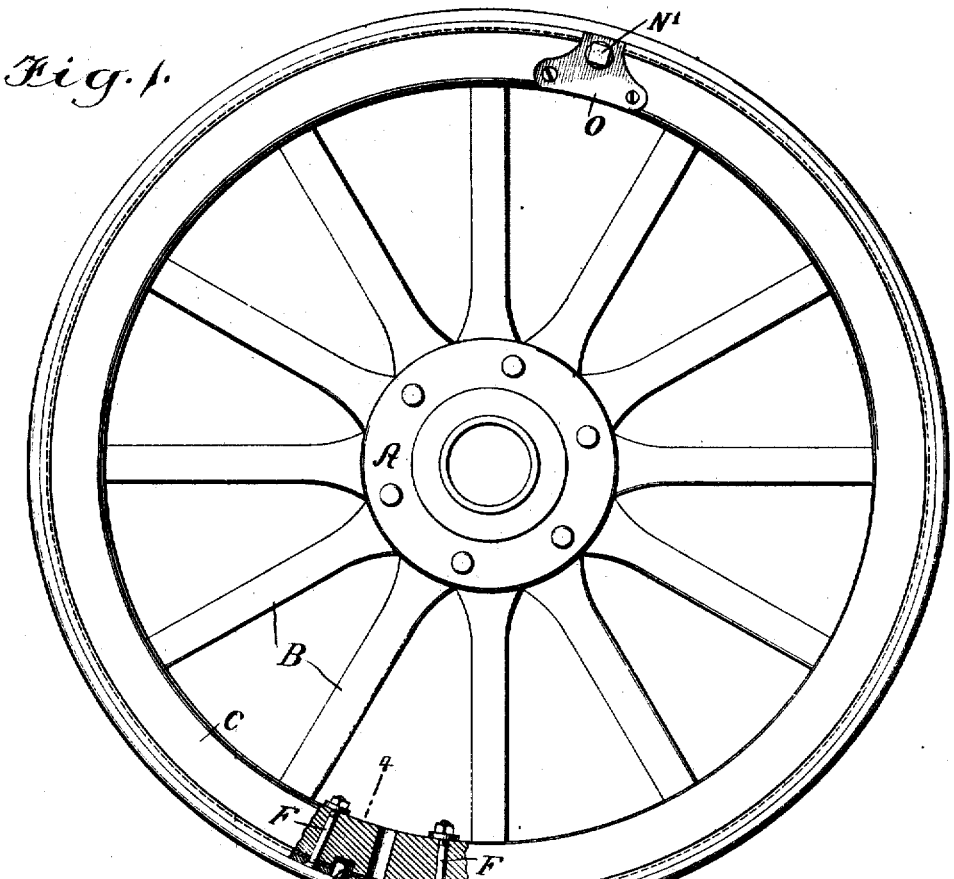
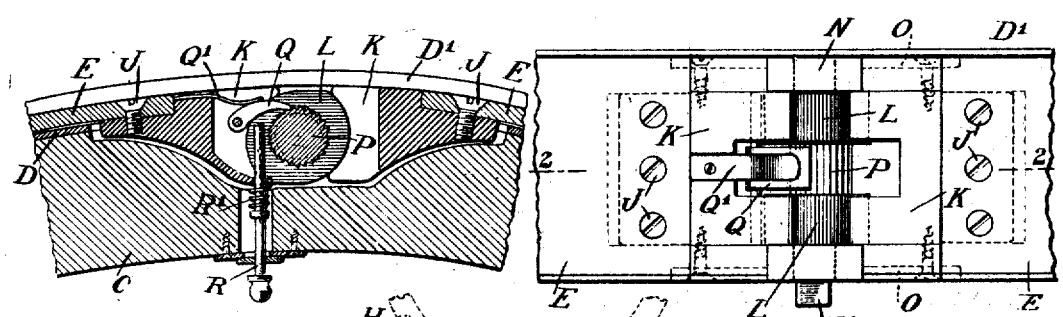
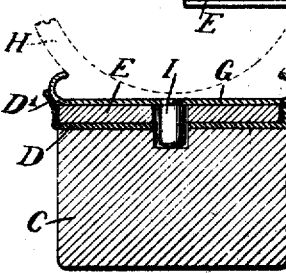
WITNESSES
INVENTOR
Eli J. Bushey
BY
ATTORNEYS

UNITED STATES PATENT OFFICE.

ELI J. BUSHEY, OF NEW YORK, N. Y.

DEMOUNTABLE RIM.

954,375.

Specification of Letters Patent. Patented Apr. 5, 1910.

Application filed April 19, 1909. Serial No. 490,659.

*To all whom it may concern:*

Be it known that I, ELI J. BUSHEY, a citizen of the United States, and a resident of the city of New York, borough of Manhattan, in the county and State of New York, have invented a new and Improved Demountable Rim, of which the following is a full, clear, and exact description.

The invention relates to wheels for automobiles and other vehicles, and its object is to provide a new and improved demountable rim, arranged to permit quick and convenient removal and with it the inflatable tire, and replacing of the rim by another whenever it is desired to do so.

For the purpose mentioned, the rim-carrying tire is clamped in place by a split clamping ring secured to the felly of the wheel, at or near the middle, and a spreading device is mounted on the felly and engages the split ends of the clamping ring, to force the latter into firm clamping contact with the inner face of the rim and thus hold the latter securely in position on the wheel.

A practical embodiment of the invention is represented in the accompanying drawings, forming a part of this specification, in which similar characters of reference indicate corresponding parts in all the views.

Figure 1 is a face view of the improvement, parts being shown in section; Fig. 2 is an enlarged sectional side elevation of the improvement and showing more particularly the spreading device in position on the felly for spreading the clamping ring, the section being on the line 2—2 of Fig. 3; Fig. 3 is a plan view of the same; and Fig. 4 is an enlarged transverse section of part of the improvement on the line 4—4 of Fig. 1.

The hub A of the wheel is connected in the usual manner by the spokes B with the felly C, having a peripheral metal band D surrounded by a clamping ring E, fastened with the band in position on the felly C by bolts F, as plainly illustrated in Fig. 1, the bolts F engaging the clamping ring E at or near the middle thereof, that is, at points opposite the split ends of the ring.

The clamping ring E is adapted to engage the inner face of the rim G, on which is removably held in the usual manner the inflatable rubber tire H, of any approved construction, and on the rim G at a point between the bolt F is secured an inwardly-extending lug I, fitting into a recess formed in the felly C, the lug I also extending through apertures in the clamping ring E and the band D.

On the split ends of the clamping ring E are secured by screws J or other fastening devices the heads K, adapted to be engaged at their opposite faces by a cam L, attached to a transversely-extending shaft N, journaled in suitable bearings O secured to the felly C, as plainly shown in Figs. 1 and 3. One outer end of the shaft N is provided with a square offset N' for the application of a wrench, crank arm or other tool, to allow of conveniently turning the shaft N so as to cause the cam L to move the heads K apart, and thus cause a spreading of the clamping ring E, so as to clampingly engage the inner surface of the rim G, with a view to securely hold the latter in place and with it the tire H mounted on the rim G. When the shaft N is turned in the reverse direction, the cam L releases the heads K, to allow the clamping ring E to swing together by its own resiliency, thus releasing the rim G and allowing convenient removal thereof from the clamping ring E and hence from the wheel, in case it is desired to repair the tire or replace the same by a new one.

In order to hold the cam L against accidental return movement after the clamping ring clampingly engages the rim G, use is made of a ratchet wheel P, secured or formed on the shaft N, and engaged by a pawl Q fulcrumed on one of the heads K and pressed on by a spring Q', as plainly shown in Figs. 2 and 3. In order to release the ratchet wheel P whenever it is desired to turn the cam L backward, as above described, use is made of a releasing pin R, mounted to slide in the felly C and one of the heads K, to engage with its inner end the pawl Q, to allow of swinging the latter out of engagement with the ratchet wheel P. Normally the rod R is held out of engagement with the pawl Q by a spring R'.

In order to prevent accidental transverse shifting of the rim G and its tire H, use is made, in addition to the lug I, of a flange D', extending upwardly and outwardly from the band D, so that one side of the rim G can abut against the flange D', as plainly indicated in Fig. 4.

From the foregoing, it will be seen that by the arrangement described, the rim carrying the inflatable tire can be readily placed in position on the wheel, or removed therefrom whenever it is desired to do so for repairs or other purposes.

Having thus described my invention, I claim as new and desire to secure by Letters Patent:

1. A wheel having a felly, a band surrounding the felly, a rim for carrying the tire, a split clamping ring interposed between the said band and the said rim, means for fastening the said clamping ring to the said felly at points approximately opposite the free ends of the ring, a lug carried by the rim and extending through the ring and band into engagement with the felly, and manually controlled means for spreading the said clamping ring.

2. A wheel having a felly, a band surrounding the felly, a rim for carrying the tire, a split clamping ring interposed between the said band and the said rim and provided with heads at its ends, means for securing the middle of the said clamping ring to the said felly, a lug carried by the rim between the said securing means and extending through the ring and band into a recess in the felly, and manually controlled means mounted on the said felly and engaging the heads of the clamping ring for spreading the clamping ring into clamping contact with the said rim.

3. A wheel having a felly, a rim for carrying the tire, a split clamping ring interposed between the said felly and the said rim and provided with heads at its ends, means for securing the middle of the said clamping ring to the said felly, a transverse shaft mounted on the felly between the heads of the said clamping ring, and a cam on the shaft and engaging the said heads of the ring to spread the same.

4. A wheel having a felly, a rim for carrying the tire, a split clamping ring interposed between the said felly and the said rim and provided at its ends with heads, means for securing the middle of the said clamping ring to the said felly, a transverse shaft mounted on the felly between the heads of the said clamping ring, a cam on the shaft and engaging the said heads of the ring to spread the same, one outer end of the shaft having a polygonal portion for the application of a tool for turning the shaft, and means for locking the shaft.

5. A wheel having a felly, a rim for carrying the tire, a split spreading ring interposed between the said felly and the said rim and provided with heads at its ends, means for securing the middle of the said clamping ring to the said felly, a cam between the heads of the said clamping ring for spreading the latter, a shaft carrying the said cam and journaled on the said felly, a ratchet wheel on the said shaft, and a pawl engaging the said ratchet wheel to prevent return movement thereof.

6. A wheel having a felly, a rim for carrying the tire, a split clamping ring interposed between the said felly and the said rim and provided with heads at its ends, means for securing the middle of the said clamping ring to the said felly, a cam between the heads of the said clamping ring for spreading the latter, a shaft carrying the said cam and journaled on the said felly, a ratchet wheel on the said shaft, a pawl engaging the said ratchet wheel to permit return movement thereof, and a manually controlled device for throwing the said pawl out of engagement with the said ratchet wheel.

7. A wheel having a felly, a band on the felly and having a flange at one side, a split ring on the band and secured to the felly at points approximately opposite the free ends of the ring, said ring being provided with heads at its ends, a cam between the said heads for spreading the ring, and a tire carrying rim on the split ring and provided with a lug extending through the ring and band into a recess in the felly.

In testimony whereof I have signed my name to this specification in the presence of two subscribing witnesses.

ELI J. BUSHEY.

Witnesses:
CHARLES McPARLAN,
M. B. MEEHAN.